April 10, 1962   J. V. MILIO ET AL   3,028,952
SAUSAGE CASING CARTON
Filed Feb. 29, 1960   3 Sheets-Sheet 2
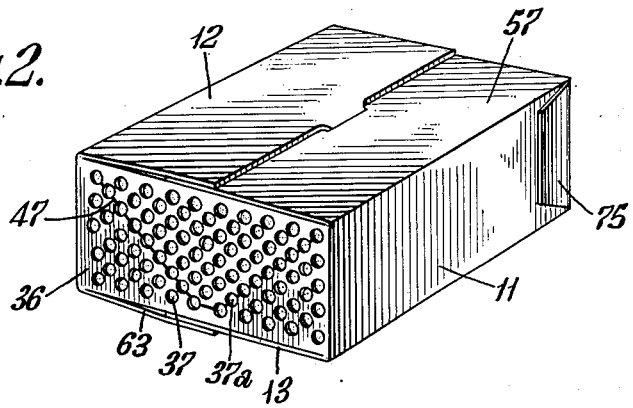
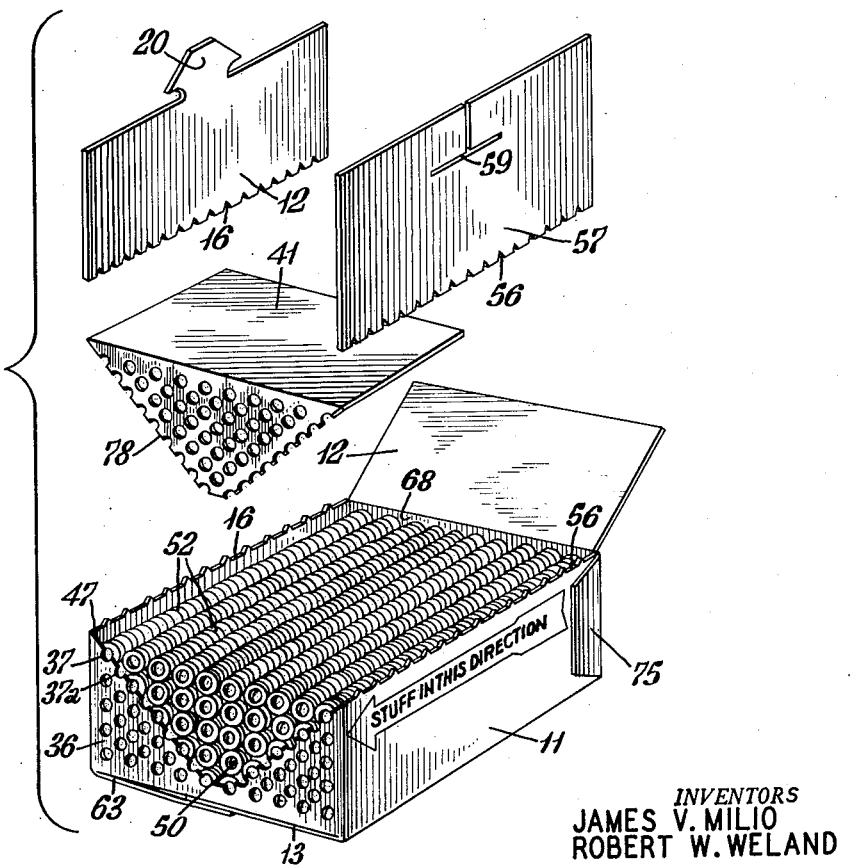
INVENTORS
JAMES V. MILIO
ROBERT W. WELAND
BY *Elmer J. Fischer*
ATTORNEY April 10, 1962  J. V. MILIO ETAL  3,028,952
SAUSAGE CASING CARTON Filed Feb. 29, 1960  3 Sheets-Sheet 3

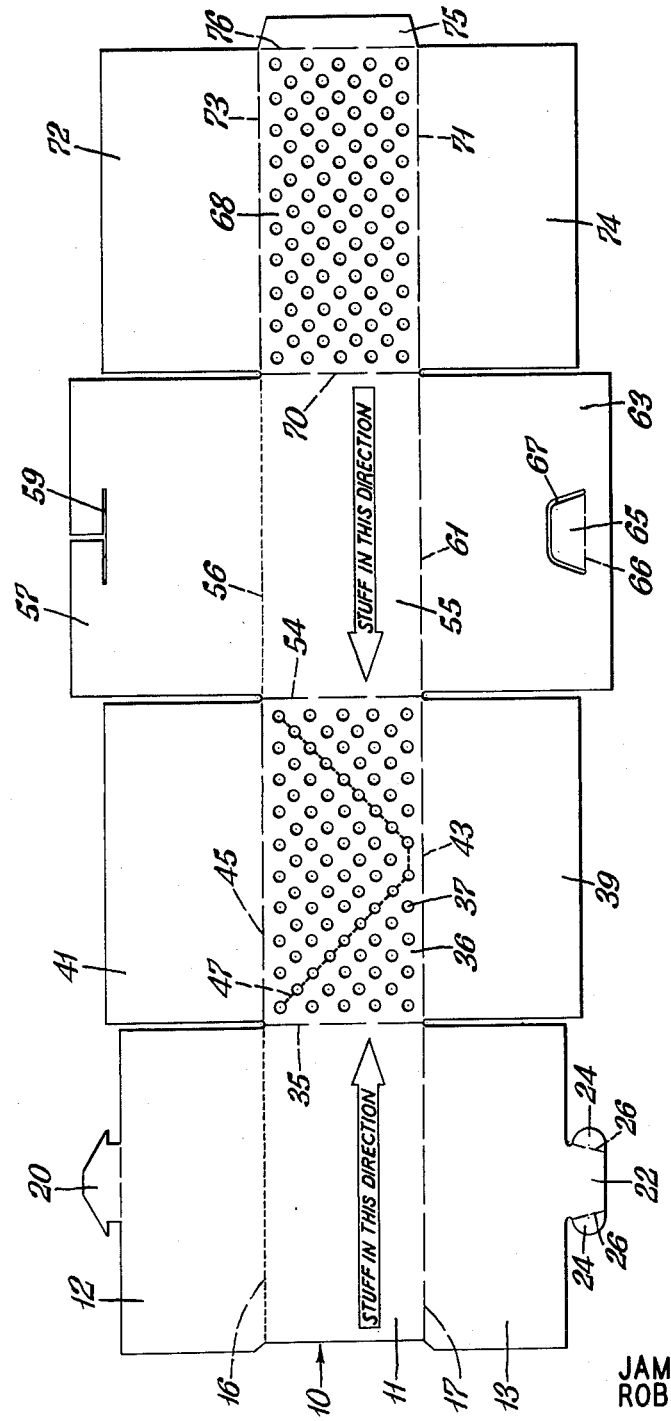

INVENTORS
JAMES V. MILIO
ROBERT W. WELAND
BY
ATTORNEY

United States Patent Office 3,028,952
Patented Apr. 10, 1962

3,028,952
SAUSAGE CASING CARTON
James V. Milio, Western Springs, and Robert N. Weland, Evergreen Park, Ill., assignors to Union Carbide Corporation, a corporation of New York
Filed Feb. 29, 1960, Ser. No. 11,849
10 Claims. (Cl. 206—46)

This invention relates to a carton having particular utility for packaging shirred and compressed lengths of cellulosic sausage casings. More particularly, the invention relates to a carton of the type referred to in the sausage trade as a caddy, and hence such designation is employed hereinafter.

Unique problems are associated with the packaging of shirred and compressed sausage casings, these problems arising both from the physical nature of such casings and from their manner of use.

Cellulose sausage casings are conventionally made in continuous lengths and are thereafter shirred and compressed by various means well known to the art to relatively rigid compressed tubular sticks of a length substantially corresponding to the length of the stuffing horn through which the meat emulsion is fed into the casing. Typically, a 40 foot or longer length of cellulose casing is shirred and compressed to yield a rigid tubular stick of about 6 to 10 inches in length.

It is usually preferred to maintain the moisture content of the cellulose casing at a low level for the shirring operation and at a higher level for the stuffing operation. Consequently, it has been the practice to package the shirred casing in a caddy having ventilating openings in its vertical end panels, some of said openings registering with the bores of the shirred casings and other openings with the space intermediate the outer surfaces of each group of four casings whereby external humid air can readily enter the package and humidify the casings to the desired extent. The shirred casings, upon being suitably humidified, are kept in this condition until used by wrapping the caddy with a wax treated paper or other suitable moisture-impervious wrapping material. Ventilated caddies conventionally used by the trade for packaging shirred casing are illustrated and described in U.S. Patent 2,181,329 to Alfred G. Hewitt.

One of the problems associated with packaging of shirred and compressed sausage casings is due to the longitudinal expansion of the compressed casing upon storage from its original shirred and compressed length. Moreover, such expansion is higher upon humidification of the casings. The longitudinal casing expansion is resisted by the vertical end panels of the caddy. As a consequence, however, the shirred casings become tightly wedged against the caddy's end panels and thus it requires special care on the part of the stuffing operator to remove the shirred casing stick from the carton without breaking it. Such breakage can cause either a puncture in the casing wall or more frequently, a collapsing of the shirred wall structure. In the former instance, the casing is regarded as defective because the sausage emulsion leaks through the puncture and in the latter instance the collapsed wall structure impedes sheathing of the casing over the stuffing horn.

In conventional stuffing operations it is preferred to de-shir the casing in a direction opposite to that in which it was shirred. Accordingly, use has been made of directional arrows printed on the side and/or top panels of casing caddies to indicate to the stuffing operator which end of the shirred casing should be sheathed initially over the stuffing horn. Such means for indicating proper stuffing direction of the shirred casing are dependent upon the operator's continuous visual alertness. Operator fatigue or forgetfulness, distractions, or other incidents are the ordinary practical limitations on such means for indicating proper stuffing direction.

It is an object of this invention to provide a ventilated carton or caddy for packaging of shirred and compressed sausage casings and having a construction and arrangement of parts facilitating rapid manual removal of the shirred casings without breakage in removal from the carton.

Another object is to provide in a ventilated sausage casing caddy means for the stuffing operator to readily detach a portion of one of the ventilating apertured end panels of the caddy whereby the shirred casings can then be individually and rapidly removed from the caddy without breakage of the casing stick.

A further object is to provide in a ventilated caddy means for easy manual detachment of a portion of one of the ventilating apertured end panels, said portion being non-detachable, however, by pressure exerted thereon from the longitudinal expansion of the shirred and compressed casings.

A further object of this invention is to provide a ventilated caddy which upon removal of a portion of one of its apertured end walls and each of its side top flaps forms a dispensing hopper facilitating individual removal of the casings, the discharge opening of the hopper being preferably immediately adjacent to that end of the casing which is preferably initially sheathed onto the discharge end of the stuffing horn.

Other objects of the invention will become apparent as the description thereof proceeds.

According to the present invention, a carton or sausage casing caddy having ventilating apertures in each of its end panels is provided with integral means for directionally controlling the manual tearing off of a substantial portion of one of said apertured panels along a predesignated path. Preferably, the tear path is of a U or V shape, with the widest part of said shape being located at the top of the caddy, whereby upon manual removal of a portion of the panel along said tear path there is formed a spout shaped opening in the remaining portion of the apertured end panel for facile dispensing of the shirred casings packaged in the carton.

In the preferred embodiment of the invention, the integral means for guiding the manual tearing along a predesignated path is formed by a combination of the ventilating apertures or openings and one or more line perforations through the panel in the spaces between adjacent apertures.

The preferred means by which the objects of this invention have been accomplished are illustrated in the accompanying drawings, in which—

FIG. 1 is a plan view of a carton blank for forming a carton or caddy therefrom having a V shape perimeter tear path on one of its apertured end walls;

FIG. 2 is a perspective view of the caddy as assembled from the blank of FIG. 1;

FIG. 3 is an exploded perspective view of a caddy after being opened and with certain parts separated therefrom;

Figure 4:
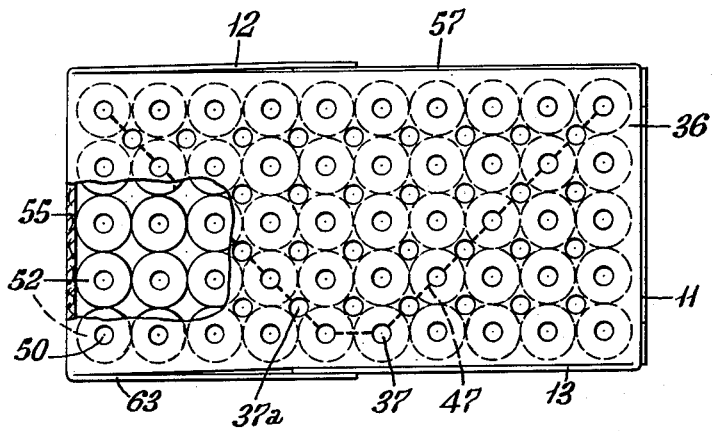
FIG. 4 is an end view, partly in broken section, of the caddy shown in FIG. 2.

Referring more specifically to the drawings, and particularly FIG. 1, there is shown therein a carton blank 10 formed from a single unitary piece of cardboard or equivalent carton making stock, said blank being broadly indicated as 10. The carton blank 10 has at one end a side panel 11 connected to a top flap 12 along perforated fold line 16. A bottom flap 13 is connected to side panel 11 along a score or fold line 17. Top flap 12 is provided with a locking tab 20 and bottom flap 13 is provided with a locking tab 22 having side ears 24 connected thereto along score or fold lines 26.

Side panel 11 is connected at its right end along score line 35 to a ventilating apertured end panel 36 provided with die cut or punched circular ventilating openings 37. Connected to end panel 36 are a bottom panel 39 along a score or fold line 43 and a top panel 41 along score or fold line 45. The pattern of ventilating openings 37 in end panel 36 is such that they stand as best shown in FIGS. 3 and 4 directly opposite the openings or bores 50 of the shirred casings 52 enabling movement of humidifying or drying air through the casings from one end thereof to the other. As shown in FIG. 4, additional ventilating openings 37a can be provided for circulation of air at desired humidity along the outer surfaces of shirred casings 52.

Apertured end panel 36 is provided with a V-shaped predesignated tear path 47 beginning at the upper left hand corner, extending diagonally downward to about the mid-point of the bottom row of ventilating openings 37 and then angling upwardly to the upper right hand corner of panel 36. The tear path 47 extends substantially in a line passing through the centers of adjacent ventilating openings 37, 37a, the tear path being line or roulette perforated between adjacent openings 37 and 37a.

Connected to ventilating end panel 36 along a score or fold line 54 is another side panel 55 in duplication of side panel 11. Panel 55 has connected thereto along perforated fold line 56 a top flap 57 having a T shape slot 59 cut therethrough along its outer top edge for locking engagement with locking tab 20 of flap 12. The lower side of side panel 55 is connected along a fold or score line 61 to a bottom flap 63 having near its bottom edge a tongue 65 formed by die cutting a U-shaped slot 67 through the panel, said tongue being hinged to the flap 63 along scored line 66. Ears 24 of locking tab 22 when pressed through the slot 67 lock bottom flap 13 to flap 63. Side panel 55 is joined to a second ventilating end panel 68 along score or fold line 70. A top flap 72 is connected to the upper side of panel 68 along fold or score line 73. The lower side of ventilating panel 68 is connected to a bottom panel 74 along fold or score line 71.

An end flap 75 is connected to ventilating panel 68 along a score or fold line 76.

The carton blank 10 is readily assembled to form the caddy illustrated in FIG. 2 by folding the blank along fold lines 35, 54, 70 and 76 to form a rectangular tube, and means are used to fasten securely end flap 75 to the outer face of side panel 11. Bottom panel 39 and bottom panel 74 are folded inwardly 90° along score lines 17 and 71 respectively and held in this position by folding thereover bottom flap 63 and next bottom flap 13 and then interlocking said flaps by inserting ears 24 of locking tab 22 into the slot 67 of flap 63.

After the caddy has been filled with shirred casing sticks arranged in parallel rows and with their ends adjacent to the ventilating openings 37 as shown in FIG. 4, the caddy is closed by inwardly folding top panels 41 and 72 along their respective fold lines 45 and 73. The folded top panels are secured in position by folding thereover top flap 57 and then folding over it top flap 12 and engaging the tab 20 into T shape slot 59 of top flap 57.

When the stufing machine operator is ready to use the shirred casings 52 in the caddy, he opens the caddy by unlocking top flaps 12 and 57 and then removes them by tearing along their perforated lines 16 and 56 respectively.

The operator then unfolds top flap 72 to expose the shirred casings 52 in the caddy. Next the operator removes a substantial part of the apertured end panel 36 by grasping top panel 41 and tearing it and attached V shape perforated portion 78 from end panel 36. As shown in FIG. 3, the shirred casings are thereby exposed for easy removal from the caddy, and furthermore, are presented to the operator in the proper direction for stuffing through the spout shaped opening formed in panel 36 by removal of panel 41 and V-shaped portion 78 of panel 36.

Figure 5:
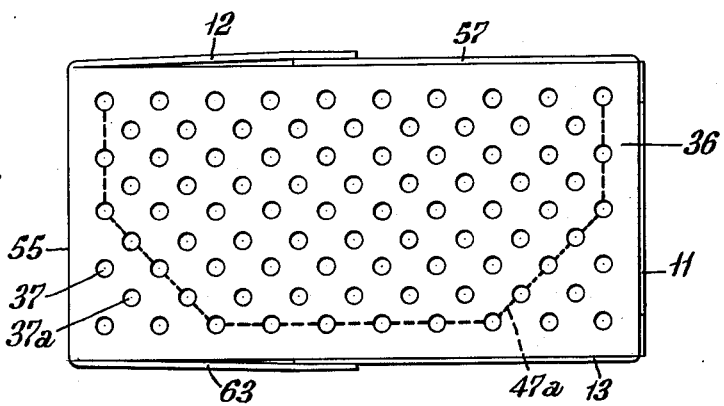
FIG. 5 is an end view of a ventilated caddy showing a further embodiment of a directional controlled tear path on an apertured end panel.

A further embodiment of a directional controlled tear path in a ventilating end panel 36 is illustrated in FIG. 5 wherein the tear path 47a starts at the upper left hand corner of the panel 36, extends downwardly through the centers of adjacent ventilating openings 37 and then diagonally towards the base line of the openings 37, across the base line through the centers of several openings 37, then diagonally upwards, and finally straight upwards to the upper right hand conrer of panel 36.

Figure 6:
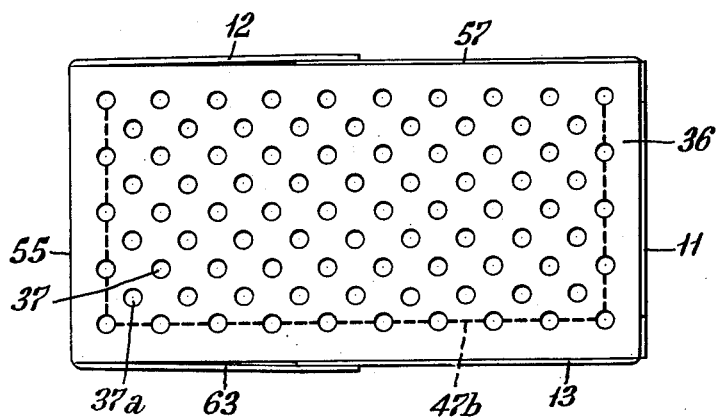
FIG. 6 is an end view of a ventilated caddy showing still another embodiment of a directional controlled tear path.

Another embodiment of a directional controlled tear path is shown in FIG. 6 wherein the tear path 47b extends through the centers of all the outer ventilating openings 37 on each of the vertical sides and base of panel 36 to form a U-shaped tear path.

In one practical embodiment of the present invention, a caddy was assembled from a carton blank as illustrated in FIG. 1. The blank was a laminated cardboard consisting of a center layer of 0.035 inch thick full bending chipboard having on one face an adherent layer of 0.004 inch thick kraft paper (40 pounds per ream weight) and on the other face an adherent layer of 0.004 inch thick kraft paper impregnated with microcrystalline wax (15 pounds wax per million square inches paper). The wax-impregnated paper side of the cardboard upon folding of the blank into a caddy formed the interior surfaces thereof. The other side of the cardobard forming the exterior surface of the caddy was printed with the illustrated legend "Stuff In This Direction" on each side panel 11 and 55.

Side panels 11 and 55 were each 10¼ inches long and 4¾ inches in height. Apertured end panels 36 and 68 were each 9½ inches long and 4¾ inches in height. The ventilating openings 37 all had a diameter of ⅜ inch. The predesignated tear path 47 illustrated in FIGS. 1 to 4 was formed by cut line perforations 1/16 inch long, each spaced 1/16 inch apart. The caddy was packed with 50 pieces of shirred and compressed sausage casings 52 (each 55 feet long before shirring and compressing) packed in five layers of 10 casings each layer. The length of the compressed casings was 9¾ inches as initially packed in the caddy. The average diameter of the shirred and compressed casings was about 0.8 to 0.9 inch.

After the casings 52 had been packed and the caddy closed, the casings were conditioned to a desired moisture content by permitting air of suitable humidity to pass through the openings 37 and 37a. The caddy was then wrapped in moisture-proof paper or plastic film to preserve the moisture content of the casings until the caddy was opened by the stuffing machine operator.

During storage of the casings the shirred sticks expanded in length because of gradual partial release of the shirred folds of the casing. Expansion also resulted from humidification of the casings to a higher moisture content than its moisture content during shirring. It has been observed that such expansion of a shirred and compressed casing exerts a force per casing as much as 5 pounds of expansive force against the inner faces of the apertured end walls 36 and 68. Consequently, in the caddy as described supra containing 50 compressed casings, a total force of some 250 pounds was applied to the end walls 36 and 68, such force being noted in the bulging of the end walls.

Surprisingly, despite the manual ease of removing a portion of apertured wall 36, the caddies of this invention are unexpectedly resistant to rupture from the longitudinal expansion of the shirred and compressed casings as otherwise might have been expected from the presence in one of the apertured end walls of a perforated tear path of the patterns herein described. Furthermore, shock forces occurring during shipment have not caused rupture of the caddy.

It will also be observed that the tear path patterns illustrated in the several embodiments are spaced from the edges of the panel 36 a distance at least equal to approximately the radius of the shirred casings. A two-fold purpose is served by maintaining such maximum spacing.

The first puprose is to secure resistance to rupture of the tear path during shipment. A tear path closer to the edges of the panel 36 than the casing radius has been found to cause premature breakage of the tear path prior to manual opening of the caddy.

A second purpose served by such spacing of the tear path and particularly from the bottom edge of panel 36 is to prevent wetting of the shirred casing when placed on the conventional stuffing table adjacent to the stuffing machine.

As the casing is being stuffed, it is showered with a spray of water at a position several feet removed from the end of the stuffing horn. Surplus water from the shower floods the top of the stuffing table. If a casing caddy with the end wall completely removed is placed on a flooded stuffing table, the water may thereby run into the caddy and wet the lower layer of shirred casings. Differential wetting of shirred casing adversely affects uniformity of stuffing. Consequently, it is desirable to retain a shallow curb in the lower part of the caddy end wall from which the major portion has been removed.

It is to be understood that the invention is not limited to the preferred embodiments described in the drawings and specification except so far as the claims may be so limited and that changes may be made in form and arrangement of parts without departing from the spirit of the invention.

What is claimed is:

1. In a sausage casing caddy having a plurality of ventilating apertures in two opposite walls thereof to enable air to enter the caddy and move lengthwise through the bores of shirred sticks of casing packaged therein, the improvement which comprises a predesignated perforated tear path in one of said walls for easily detaching a substantial portion thereof, said tear path extending generally from aperture to aperture.

2. In a sausage casing caddy having a plurality of ventilating apertures in two opposite walls thereof to enable air to enter the caddy and move lengthwise through the bores of shirred sticks of casings packaged therein, the improvement which comprises a perforated tear path in one of said walls for easily detaching a substantial portion thereof, said tear path comprising adjacent apertures and line perforations between said adjacent apertures.

3. In a sausage casing caddy having a plurality of ventilating apertures in two opposite walls thereof to enable air to enter the caddy and move lengthwise through the bores of shirred casing sticks, the improvement which comprises a perforated tear path in one of said walls for easily detaching a substantially V shaped portion thereof from the caddy, said tear path comprising adjacent apertures and line perforations between said adjacent apertures.

4. A sausage casing caddy having a plurality of ventilating apertures in two opposite walls thereof and a predesignated perforated tear path in one of said walls for easily detaching a substantial portion thereof, said tear path extending generally from aperture to aperture and spaced from the wall edges a distance of at least equal to the radius of the shirred casings to be packaged therein.

5. A package comprising a sausage casing caddy having a plurality of ventilating apertures in two opposite walls thereof and shirred, compressed sausage casings packaged therein, the bores of said casings registering with the apertures to enable air to move through said bores, said caddy having a perforated tear path in one of said apertured walls comprising adjacent apertures and line perforations between said adjacent apertures for easily detaching a substantial portion of said wall along said tear path.

6. A package according to claim 6 wherein part of said apertures register with the bores of the sausage casing to enable air to enter the caddy and move lengthwise through said bores, and the remaining apertures enabling air to move along the outer surfaces of said casings.

7. A package according to claim 5 wherein the tear path has a V shape configuration.

8. A package according to claim 5 wherein the tear path has a U shape configuration.

9. In a sausage casing caddy containing lengthwise, shirred sticks of casing; opposite end panels having a plurality of ventilating apertures therein to enable air to enter the caddy and move lengthwise through the bores of shirred sticks of casing packaged within said caddy, one of said end panels having a predesignated perforated tear path extending generally from aperture to aperture for easily detaching a substantial portion of said end panel, top panels connected to the top of said end panels and folded inwardly 90 degrees in closed relationship, side panels connected to the sides of said end panels and folded 90 degrees inwardly, and detachable interlocking top flaps connected to the top of said side panels along perforated tear path fold lines and folded 90 degrees inwardly interlocking in overlapped relationship to said top panels to maintain them in their closed position, said top flaps being easily detached from the caddy by unlocking said top flaps and tearing them along the perforated tear path fold lines.

10. In a sausage casing caddy containing lengthwise, shirred sticks of casing; opposite end panels having a plurality of ventilating apertures therein to enable air to enter the caddy and move lengthwise through the bores of shirred sticks of casing packaged within said caddy, one of said end panels having a predesignated perforated tear path extending generally from aperture to aperture for easily detaching a substantial portion of said end panel, bottom panels connected to the bottom of said end panels and folded inwardly 90 degrees in closed relationship, side panels connected to the sides of said end panels and folded 90 degrees inwardly, interlocking bottom flaps connected to the bottom of said side panels and folded 90 degrees inwardly interlocking in overlapped relationship to said bottom panels to maintain said bottom panels in their closed position, top panels connected to the top of said end panels and folded inwardly 90 degrees in closed relationship, and detachable interlocking top flaps connected to the top of said side panels along perforated tear path fold lines and folded 90 degrees inwardly interlocking in overlapped relationship to said top panels to maintain them in their closed position, said top flaps being easily detached from the caddy by unlocking said top flaps and tearing them along the perforated tear path fold lines.

References Cited in the file of this patent

UNITED STATES PATENTS

| | | |
|---|---|---|
| 1,251,598 | Vale | Jan. 1, 1918 |
| 1,741,369 | Kondolf | Dec. 31, 1929 |
| 2,181,329 | Hewitt | Nov. 28, 1939 |
| 2,709,031 | Gondek | May 24, 1955 |

UNITED STATES PATENT OFFICE
CERTIFICATE OF CORRECTION

Patent No. 3,028,952

April 10, 1962

James V. Milio et al.

It is hereby certified that error appears in the above numbered patent requiring correction and that the said Letters Patent should read as corrected below.

Column 6, line 11, for the claim reference numeral "6" read -- 5 --.

Signed and sealed this 24th day of July 1962.

(SEAL)
Attest:

ERNEST W. SWIDER
Attesting Officer

DAVID L. LADD
Commissioner of Patents